Aug. 4, 1936.  J. GERSTLE  2,050,092
AUDION TUBE TESTER
Filed March 16, 1931  2 Sheets-Sheet 1
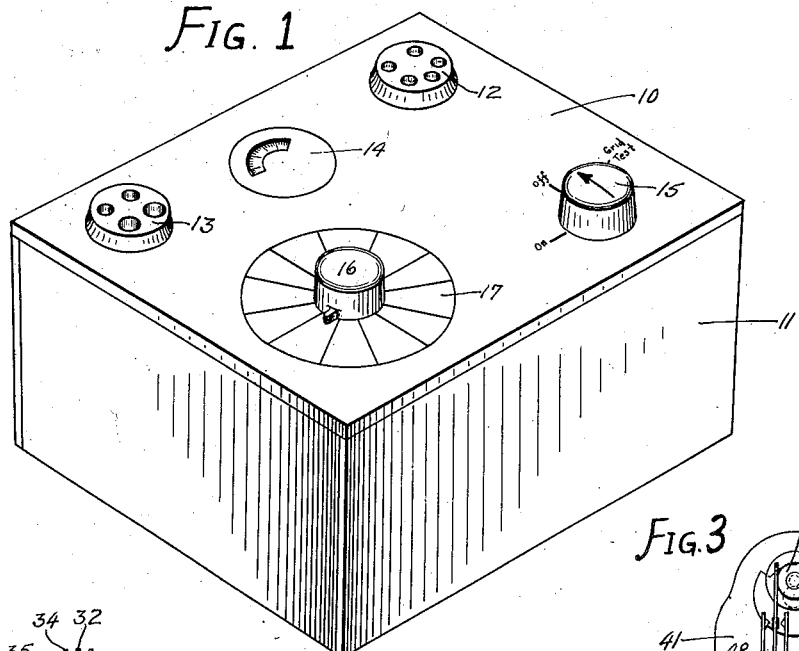
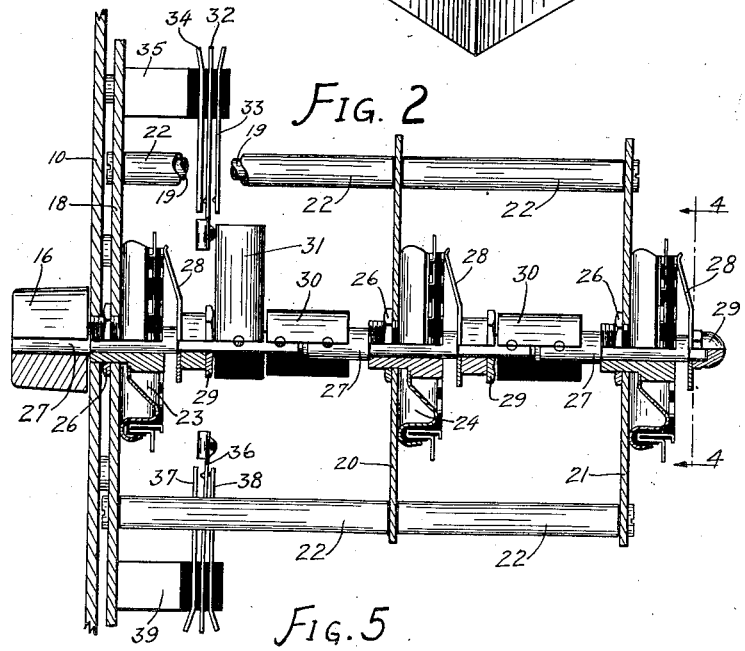
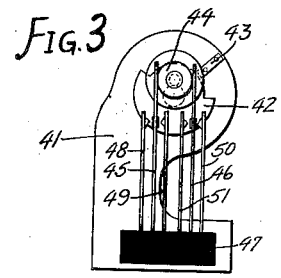
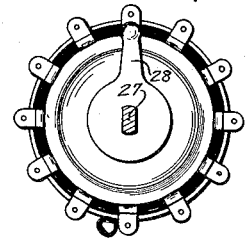
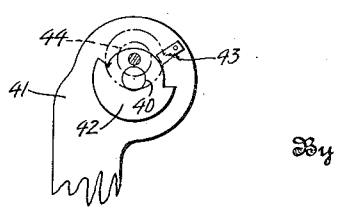
Inventor
John Gerstle
By Paul D. Garber
His Attorney

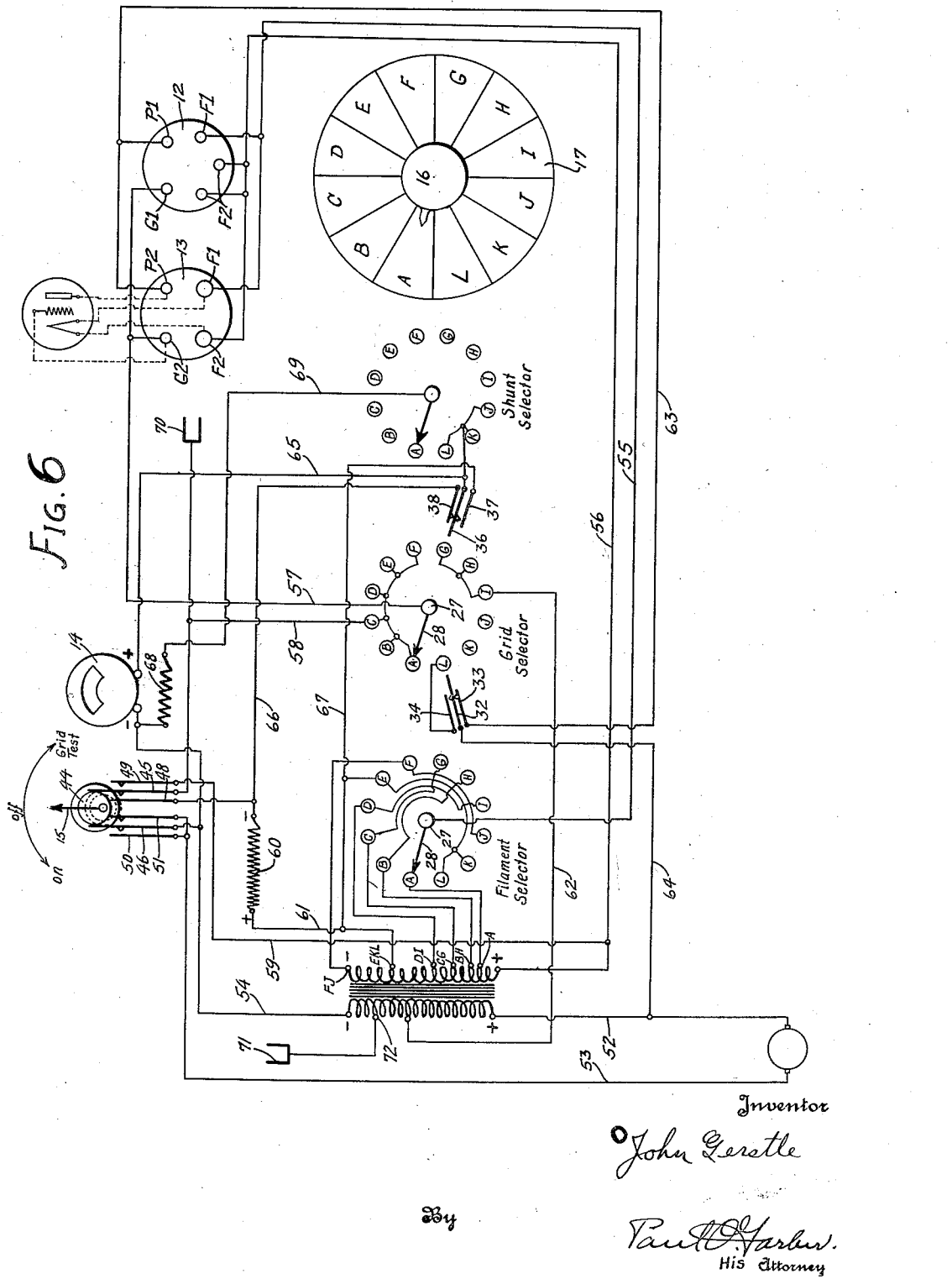

Patented Aug. 4, 1936

2,050,092

UNITED STATES PATENT OFFICE 2,050,092

AUDION TUBE TESTER

John Gerstle, Dayton, Ohio, assignor, by direct and mesne assignments, to Caxton Brown, Newark, N. J.

Application March 16, 1931, Serial No. 522,892

5 Claims. (Cl. 250—27)

This invention relates to improvements in devices for testing audion tubes and the like.

A well known method of testing audion tubes is to energize the filament and plate circuits by means of batteries, more recently, by means of a step-down transformer properly energized, and then measuring the plate current at two different values of grid bias voltage, impressed on the grid of the tube either by grid batteries, voltage derived from the transformer or by the drop in potential across a resistor common to the plate and grid circuits. This test indicates the value of the mutual conductance of the tube, that is, the ratio of change in plate current to the change in the applied grid voltage. A rectifier type of tube is tested by measuring the plate current for fixed values of filament and plate voltages. In a practical tube tester it is unnecessary to determine the actual value of the mutual conductance, a relative value, indicative of the true value being sufficient.

This relative value of mutual conductance is usually obtained in ordinary tube testers by what is commonly termed a "grid shift". The plate current is measured for a given value of grid bias. The grid bias is then shifted to another value and another measurement of the plate current taken. The difference in value of the two measurements indicates the relative value of mutual conductance of the tube being tested.

The grid shift may be accomplished in various ways, by cutting out a portion of the transformer secondary, by shorting or cutting out a section of a resistor common to both the plate and grid circuits or by cutting out either or both the resistor or transformer secondary from a series combination of the two from the grid circuit. In the instant invention I prefer to use a "grid shift" which cuts out a resistor common to the plate and grid circuits, and the transformer secondary.

Also audion tubes on the market at the present time vary as to their filament voltage requirement. Those testing devices that have come to applicants attention rely on circuit shifting devices, rheostats and the like, or a plurality of tube sockets permanently connected to taps on the secondary of a transformer to adjust the voltages applied to the tube filament.

Other circuit changing or current regulating devices such as shunts, resistors, etc., are necessary in testing devices in order to properly measure the mutual conductance of various types of tubes. In order to select the proper voltages for the grid and filament circuits and to cut in and out such regulating devices as resistors, shunts, etc., ordinary tube testers utilize a plurality of manipulative devices such, for instance, as switches, selector knobs, buttons, etc., the very number of which tends to confuse the operator. This frequently results in the operation of the wrong device thereby causing damage either to the tube or to the testing device.

The instant invention aims to reduce the number of manipulative devices to a minimum thereby simplifying the design and operation of a tube testing device, thus reducing the possibility of damage to the testing device or to the tube under test.

It is, therefore, an object of this invention to provide a tube testing device with a normally open operating switch, which switch automatically opens the current supply at the completion of the test.

Another object is to provide in a tube tester a novel circuit selector simultaneously to apply voltages of correct values to the several elements of the tube.

Still another object is to provide a tube testing device with a novel means for shifting the voltage normally applied to the plate of the tube, to the grid circuit simultaneously to applying the proper voltages to the other elements of the tube.

With these and other incidental objects in view, the invention consists of certain novel features of construction and combinations of parts, the essential elements of which are set forth in the appended claims and a preferred form or embodiment of which is hereinafter described with reference to the drawings which accompany and form a part of this specification.

In said drawings:

Fig. 1 is a perspective view of the testing device.

Fig. 2 is a sectional view through the device showing the selector switches partly broken away for clearness.

Fig. 3 is a detail view of the "grid shift" or testing switch.

Fig. 4 is a sectional view taken on line 4—4 in Fig. 2.

Fig. 5 is a detail view of the grid shift stop.

Fig. 6 is a circuit diagram of the testing device embodying the present invention.

In general, the tester includes a panel of suitable dielectric material, preferably hard rubber, bakelite, etc., upon which panel are mounted the circuit selctor switches, grid shift, tube sockets, and the meter for measuring the plate current. After the parts have been assembled on the panel, the entire unit is lowered into a cabinet or casing to which the panel is then secured by screws or other suitable fastenings. The casing may be made of any suitable material.

The electrical elements of the tester include a step-down transformer of suitable design having its primary and secondary tapped at the proper intervals to supply a plurality of voltages of suitable values. These voltages are distributed to the several elements of the tester through selector switches adapted to be operated by a single manipulative device.

One of the features of this invention is the elimination of manually controlled circuit shifting devices, rheostats and the like, which when improperly operated, are the cause of considerable trouble and may cause damage to the tube, meter or to the tester in general. The values of the tapped circuits are fixed, and a voltage regulator of any suitable design may be inserted in the supply line in case the voltage on this line fluctuates to a marked degree.

Detailed description

A detailed description of the physical features of the testing device will be given first. Referring to Figure 1, the panel 10 rests on the casing 11 and is conveniently secured thereto by screws or any suitable means. In the upper right hand corner of the panel is mounted a tube socket 12 adapted to receive a tube having five prongs. In the opposite corner of the panel is mounted a socket 13 adapted to receive a tube having four prongs. The terminals of the sockets 12 and 13 are connected in parallel and may be considered as a single socket since, when selecting and applying currents of particular values to the terminals of one of the sockets, currents of the same values are also applied to the corresponding terminals of the other socket. These sockets, in other words, are to be considered as a singularity instead of a plurality of sockets.

Between these two sockets is located a meter 14 adapted to measure the plate current under conditions controlled by a grid shift knob 15, also mounted on the panel 10. A circuit selector knob 16 is provided to operate a plurality of selector switches, to be described later. Engraved, or otherwise suitably marked on the panel, around the selector knob 16, is a dial 17. This dial is divided into a plurality of sections by radial lines. In the sectors thus formed may be inscribed identifying or index numbers of the different tubes which the device is adapted to test.

A frame work including a sub-panel 18 (Fig. 2) suitably supported by the main panel, an intermediate plate 20, and a bottom plate 21, is provided to support a plurality of selector switches. The plates 20 and 21 are supported by rods 19 and are spaced apart on said rods by spacers 22. The rods are mounted on the sub-panel 18.

There are three selector switches, a filament switch 23 mounted on the sub-panel 18, a grid selector switch 24 mounted on the intermediate plate 20 and a shunt selector switch 25 mounted on the bottom plate 21. These switches are mounted in the usual manner and are held in position by nuts 26 on threaded projections of the bodies of the switches. In the illustrative embodiment of the invention the switches are provided with twelve contacts, but it is to be understood that any convenient number of contacts may be provided without departing from the spirit of the invention.

Each of the switches 23, 24, and 25 is provided with a shaft 27. A shoulder on each of the shafts 27 is held in contact with the threaded projection of its switch by a spring contact arm 28, which arm is secured on said shaft by a retaining nut 29. The three shafts are joined by insulated couplings 30 so that they rotate in unison when the selector knob 16 is turned, rotating the contact arms 28. Thus corresponding contacts on each of the switches are selected at the same time.

Mounted on the shaft 27 for the filament switch 23 is a rod 31 of suitable dielectric material, forming a convenient means for operating a two way switch comprising a center leaf 32 and two outer contacts 33 and 34. This switch is mounted on a suitably insulated rod 35 projecting from the sub-panel 18. The purpose of this switch will be brought out later. A similar switch comprising an inner leaf 36 and a pair of outer leaves 37 and 38, supported on a rod 39 of insulating material, is also operated by the rod 31, but when said rod is in a different position.

The grid shift knob 15 (Figs. 3 and 5) is secured on a short shaft 40 rotatably mounted on a plate 41 secured to the panel 10. Fast on the inner end of the shaft 40 is a disc 42 having its periphery recessed to receive a stop bar 43 secured to the plate 41. A disc 44 of insulating material is rotatably mounted on a stud projecting from the disc 42. This disc rests between a pair of switch leaves 45 and 46 mounted in a block of insulating material 47 secured to the plate 41. On one side of the switch leaf 45 is a leaf 48 and a similar leaf 49 is located on the opposite side of the leaf 45. Both of the leaves 48 and 49 are mounted in the block 47. Similarly a pair of switch leaves 50 and 51 are mounted one on each side of the leaf 46.

The disc 42 is so located with reference to the stop bar 43 that when the grid shift knob 15 is turned to the "on" position the eccentrically mounted disc 44 is moved past center until the shoulder of the recessed disc 42 strikes the stop bar 43, the tension of the switch leaf 46 retaining the shaft 40, the disc 42 and the disc 44 in this position until the knob 15 is turned back to the "off" position. However, when the knob 15 is rotated in the opposite direction, the stop bar 43 arrests the movement of the shaft 40 just before the disc 44 arrives at center. Now, when the knob is released the tension of the switch leaf 45 is sufficient to restore the shaft 40 and the disc 44 to the "off" position automatically. The purpose of this construction is to relieve the operator of the necessity of holding the knob in the "on" position while a tube of the so called "heater" type, which require a considerable time to heat to a point where a proper test may be made, is being tested. On the other hand, at the completion of a test, the tension of the leaf 45 automatically restores the knob to neutral or "off" position thereby opening the current supply circuit.

The meter 14 may be of any suitable design and is connected in the circuit of the tube in the usual manner. In the schematic circuit of the tester disclosed in Fig. 6, the supply circuit is represented by the reference numerals 52 and 53. The line 52 is connected directly to one side of the primary winding of the transformer and the line 53 is connected to the switch leaves 50 and 51. When the grid shift knob 15, which knob is represented by the arrow 15 in Fig. 6, is turned counter clockwise (as viewed in this figure) the eccentric disc 44 forces the center switch leaf 46 into contact with the leaf 50 thereby closing the current supply circuit to the transformer, the leaf 46 being connected to a line 54 leading to the other side of the transformer primary winding. As stated above, the disc 44 is mounted so as to remain in this position until the operator restores the knob 15 to the "off" position, at which time the switch leaf 46 centers itself, opening the supply circuit.

When the knob 15 is turned in the opposite direction, that is, clockwise from the "off" position (Fig. 6), the disc 44 falls away from the leaf 46, whereupon this leaf, under the influence of its own tension, makes contact with the leaf 51. Thus it can be seen that the supply circuit to the primary of the transformer is closed when the grid shift knob 15 is in the "on" position or in the righthand position, hereinafter referred to as the "grid test" position.

Filament circuit

A description will now be given of the circuit diagram, shown schematically in Figure 6. It may be stated here that the selector switch unit, comprising the three switches 23, 24, and 25 (Fig. 2), the shaft assembly 27 and the knob 16 for rotating this unit, has no normal position, but is adapted to be rotated in the shortest direction to the desired point. Analogous contacts on the selector switches are given the same reference characters.

Audion tubes, generally, may be divided into six classifications according to filament voltage requirements. For the purpose of selecting the proper voltage to be applied to the filament of a particular tube being tested, six taps are made in the secondary of the transformer. These taps are connected to the contacts of the filament selector switch as follows:

The contact A is connected to the tap A on the transformer.

The contact B is connected to the tap marked BH on the transformer secondary. The contact H is also connected to the tap BH.

The contacts C and G are connected to the tap marked CG.

The contacts D and I are connected to the tap marked DI on the transformer.

The contacts E, K and L are connected to the tap marked EKL.

The contacts F and J are connected to the tap marked FJ.

Thus it can be seen that, if the contact arm 28 for the filament selector switch is set at A, voltage is supplied to this contact only from its tap A. If the arm 28 is set either at the contact B or H, voltage is supplied from the tap BH, etc. The contact arm 28 for the filament switch is connected by a line 55 to the filament terminals F1 of the sockets 12 and 13. Thus it can be seen that by setting the knob 16, and thereby the contact arms 28, to a particular section A to L inclusive, on the dial 17 the proper voltage for the filament of the tubes having their index numbers marked in the selected position, is applied to the filament terminals F1.

The filament terminals of the sockets 12 and 13 which are marked F2, are connected by a line 56 to the end of the transformer secondary marked positive, thus completing the filament circuits across the several taps on the secondary of the transformer.

The grid circuit

As was stated above, in order to measure the relative mutual conductance of an audion tube it is necessary to make two tests each with a different value of grid bias voltage. These voltages may be derived in part or in whole from the secondary winding of the transformer.

If the plate voltage is derived from the primary of the transformer and the grid bias voltage from the secondary, current will be established in the plate circuit of the tube and the tube will operate on the positive loop of the alternating current cycles. The secondary winding of the transformer may be connected in the grid circuit so as to produce a grid bias of either positive or negative value. The grid voltages are selectively supplied in the tester comprising the present invention in the following manner:

The contact arm 28 for the grid selector switch 24 is connected, by a line 57, to the grid elements G1 and G2 of the tube sockets 12 and 13. The contacts A to L inclusive for the grid selector switch are supplied with different voltages as follows: The contacts A to F inclusive are connected together and are connected by a line 58 to the switch leaf 45 of the grid shift switch. The switch leaf 49 is connected to the positive end of the transformer secondary by a line 59, and the switch leaf 48 of the grid shift is connected to the negative end of a resistor 60 having its positive end connected to the tap EKL by a line 61.

After the tube is inserted and the selector knob 16 is rotated until the pointer thereon is opposite the section of the dial 17 in which is marked the index number of the tube under test, the grid shift knob 15 is turned first to the "on" position and then back, through normal or "off", to the "grid test" position, successively contacting the leaf 45 with the leaf 48 and then with the leaf 49. In the first instance the voltage drop across the resistor 60, and across the transformer secondary winding from the positive end to the tap EKL, confers a negative bias through the switch 48, 45, the particular contact A to F inclusive at which the contact arm is setting, the contact arm 28 and the line 57 to the grid of the tube then in the proper one of the sockets 12 or 13. As soon as a reading is made from the meter 14 with the grid shift in the "on" position, the knob 15 is rotated to the "grid test" position. This opens the switch 45, 48 and closes the switch 45, 49 thus reducing the negative bias by the drop in voltage across the resistor 60 and the transformer secondary, through the elements enumerated to the tube.

The contacts G, H, and I of the grid selector switch are connected to a tap on the transformer primary by a line 62. This connection supplies a higher voltage than is derived from the secondary winding. This connection is used when testing screen grid tubes in which case a relative high voltage is supplied to the normal grid terminals G1 and G2 of the sockets 12 and 13. This does not interfere with the normal grid voltage which is now supplied to the grid of the tube through a clip 70. This clip is connected to the switch leaf 45 from which, as set forth above, the normal grid bias is supplied.

When a screen grid tube, the index mark of which appears in the proper one of the divisions G, H or I of the dial 17, is being tested, the selector knob 16 is rotated to the corresponding position, throwing the contact arm 28 for this selector into contact with the proper one of the contacts G, H, or I thus supplying a grid voltage from the tap on the primary winding of the transformer to the normal grid of the tube through the clip 70.

It will be noted, by reference to Figure 6, that no connections are made to the contacts J and K for the grid selector switch. Contact is made with J when a rectifier tube having but a single plate element is being tested. In this case the contact J on the filament switch supplies the proper filament voltage and there is no voltage applied to the grid.

When testing the first plate of a two plate rectifier tube, the selector knob is set at K. In this position there is no voltage provided for the grid circuit.

Current is supplied to the plate elements P1 and P2 of the tube sockets 12 and 13 by a line 63. This line is connected to the switch leaf 33, which leaf is normally in contact with the leak 32. The leaf 32 is connected by a line 64 to the positive side of the transformer primary.

This condition obtains when the selector knob is set to any one of its positions excepting position L. This position is selected when it is desired to test the second plate of a two-plate rectifier tube. This second plate takes the same plate voltage as the first plate, but the internal connection of this plate leads to the normal grid terminal or prong of the tube. The switch leaves 32, 33, and 34 are provided to shift the plate voltage normally applied to the plate elements P1 and P2 to the grid terminals of the sockets 12 and 13 when the selector knob 16 is set to the L position. The rod 31 (Fig. 2) shifts the switch leaf 32 from contact with the leaf 33 into contact with the leaf 34 which latter leaf is connected to the contact L for the grid selector.

Obviously, when the selector switches are set in this position, the L position, and the contact arm 29 on the grid selector is in contact with L, the voltage from the positive end of the transformer primary is directed through the leaves 32 and 34, the switch arm 29 and the line 57 to the normal grid terminal of the socket 12 where it is impressed on the second plate of the rectifier tube.

As soon as the selector knob 16 is rotated to another position the tension of the switch leaf 32 restores said leaf into contact with the leaf 33.

*The meter circuit*

The meter 14 is included in the following described circuit. One side of the meter 14 is connected to the negative end of the primary winding of the transformer by the previously described line 54. The other or positive side of the meter is connected to the switch leaf 36 (Figs. 2 and 6) by a line 65. The leaf 36 is normally in contact with the leaf 38 which is connected to the negative end of the resistor 60 by a line 66. The voltage drop across the resistor 60, as above described, confers a negative grid bias on the grid of the tube under test. By including this resistor in the meter circuit also, it is made to act as a plate current limiting device. The value of this resistor is so chosen that the plate current of all tubes tested fall within range of the meter used without promiscuous use of a shunt across the meter. When a tube having a high plate current is tested the voltage drop across the resistor 60 is correspondingly high and when the plate current is low, the voltage drop across the resistor 60 is almost zero. Thus this resistor serves the purpose of an automatic plate current regulator.

However, when testing a certain type of tube having its index number noted in the section G of the dial 17, it is desirable to cut out the resistor 60 entirely in order to obtain a higher first reading on the meter.

This is accomplished by the rod 31 (Fig. 2) when the selector knob 16 and the selector switches are set at G. At this point the rod 31 throws the leaf 36 out of contact with the leaf 38 and into contact with the leaf 37. This leaf is connected, by a line 67 to the tap EKL, to which is connected the positive end of the resistor 60. Thus the resistor 60 is cut out of the meter circuit and the positive side of the meter is connected directly to the tap EKL.

When testing rectifier tubes the plate current is so high as to throw the reading entirely off of the meter. In order to bring the reading of such tests within the range of the meter it is necessary to shunt a part of the plate current around the meter. This is accomplished by the shunt selector switch 25.

One end of a resistor 68 is connected to the contact arm 28 for this switch by a line 69. The shunt selector contacts J, K, and L, to which contacts, it will be remembered, the arms 28 are set when testing rectifier tubes, are connected to the positive side of the meter 14 by the line 65. Clearly, when the selector knob 16 is set at any one of the positions J, K or L, the resistor is connected as a shunt across the meter 14.

On tubes commonly known as "screen grid" tubes the grid connection is lead to a terminal on top of the tube. In order to connect this grid terminal in the tester grid circuit, the clip 70 is provided. This clip is connected to the wire 58 leading to the grid test switch. When testing screen grid tubes the clip 70 is attached to the terminal on the tube, thus supplying grid voltage to the normal grid element direct from the switch 45, 48, 49.

A tube of special design which has recently become known to the trade, is provided with what is known as a "space charge grid", which grid must be energized by a voltage of a particular value. When testing such tubes a clip 71, which is energized by a tap 72 on the primary winding of the transformer, is attached to a special terminal on said tube.

In some tubes the electrons for operating the tube are liberated directly from the filament of the tube. In order to reduce the hum caused by alternating current inductive fields around the filament, etc., certain types of tubes operated by alternating current, are provided with a separate electrode. This electrode is known as a "cathode" and is heated indirectly by the filament. In this case the cathode and not the filament emits the electrons. If the cathode and the filament were connected together in actual operation, a pronounced hum would result. This does not effect the test, when the tube is under test, therefore, in order to simplify the design of the tester, the cathode is connected directly to one side of the filament (see F2, Fig. 6), on socket 12.

*Operation*

An example of an operation of the tester will now be given. Let it be assumed that a tube, having its index number marked in section E of the dial, is to be tested. The operator first places the tube in the proper socket and then rotates the selector knob 16 until the pointer thereon rests opposite section E. The switch arm 28 for the filament selector determines that the proper predetermined voltage will be applied to the filament of the tube under test. In this example this voltage is supplied from the tap EKL.

The grid selector arm 28 being in contact with the contact E on the grid selector determines that the grid bias voltage will be supplied under the control of the grid shift switch. The arm 28 for the shunt selector also is in contact with its terminal E, but since no special shunt conditions are present in testing this particular type of tube, the shunt 68 is open.

All of the circuit conditions now having been quickly and accurately set by simply placing the tube in the correct socket and rotating the selector knob 16, the test is made by rotating the grid shift knob 15 to the "on" position. This energizes the transformer and at the same time energizes the grid circuit by the voltage drop across the resistor 66, and by the tap EKL on the secondary of the transformer.

A reading is taken at this time, after which the grid shift knob 15 is rotated to the "grid test" position. In this position the transformer is also energized and a more positive grid bias is provided by opening the switch 45, 48 and closing the switch 45, 49, thus supplying the grid voltage from the positive terminal of the secondary winding of the transformer. Another reading is now made from the meter and compared with the first reading. The difference being the relative value of the mutual conductance of the tube.

The knob 15 is then released and, as above described, automatically returns to the "off" position, de-energizing the transformer and opening the grid circuit.

When testing the "heater" type tubes the same procedure is followed excepting that when the grid shift knob is turned to the "on" position, it is allowed to remain in this position until the tube attains sufficient temperature to obtain a proper test. A reading is then made and the grid shift turned to the "grid test" position, the meter again read and the grid shift knob 15 released. The grid shift switch automatically returns to the "off" position, de-energizing the transformer.

It becomes apparent from the mechanics of the operation that it is impossible to supply the wrong circuit conditions for the tube under test when the grid shift is in either position unless the operator deliberately turns or sets the selector knob 16 to the wrong position.

Rectifier tubes test correctly with the grid shift in either position. When testing two plate type rectifier tubes, the selector knob 16 is first set at K and the reading made for the first plate, after which the grid shift 15 is released and the selector knob 16 turned to L and a reading taken for the second plate. Shifting the selector knob to L, as above described, shifts the plate circuit to the normal grid circuit for testing the second plate of the rectifier. It is to be understood that by making slight, obvious changes in certain connections in my tester, gas tests and other tests incidental to checking audion tubes may be effected. Also is is obvious that by including other positions on the index plate and the necessary contact points on the selector switches, a number of other tests may be made on audion tubes.

The following advantages are gained by the above described tester: Firstly, the possibility of injuring the tester, the tube or the meter is reduced to a minimum. Secondly, rapid, accurate testing is obtained without confusion, because the same process is repeated for all types of tubes, whereas, in ordinary tube testers, a number of different manipulative devices must be set.

While the forms of mechanisms herein shown and described are admirably adapted to fulfill the objects primarily stated, it is to be understood that it is not intended to confine the invention to the forms or embodiments herein disclosed, for it is susceptible of embodiment in various forms all coming within the scope of the claims which follow.

What is claimed as new is:

1. In an audion tube tester; the combination with a normally de-energized transformer having its primary and secondary windings arranged to supply voltages of various fixed values; of an electrical network; a plurality of selector switches connected in the network and to the transformer and to the elements of an audion tube; a resistor common to the circuits of two of said elements; an electrical measuring means; a single manipulative means simultaneously to set all of the selector switches thereby applying the proper voltages to the elements of the tube; means operable as an incident to the operation of the single manipulative means to cut the resistor out of the circuit of one of said elements; and a switch having two positions, said switch being adapted in one of its positions to close the transformer circuit and to cause a voltage to be applied to a certain element of the tube, and being adapted in its other position to close the transformer circuit and to apply a voltage of different value to said certain element of the tube to test the electrical condition of said tube element.

2. In an audion tube tester; the combination with a normally de-energized transformer having its primary and secondary windings arranged to supply voltages of various fixed values; of an electrical network; a plurality of selector switches connected in said network and to the transformer and to the elements of an audion tube; an electrical measuring instrument; a resistor common to the plate and the grid circuits of said tube; a single manipulative means simultaneously to set all of the selector switches thereby selecting the proper voltages for the elements of the tube; and a switch operable as an incident to the operation of the single manipulative means to cut the resistor out of the plate circuit of the tube to make a plurality of tests of the electrical conditions of said tube element.

3. In an audion tube tester; the combination with a normally de-energized transformer having its primary and secondary windings arranged to supply voltages of various fixed values; of an electrical network including a plate circuit and a grid circuit; a plurality of selector switches connected in said network and to the transformer and to the elements of an audion tube; an electrical measuring instrument; a resistor common to the plate and to the grid circuits of said tube; a single manipulative means simultaneously to set all of the selector switches thereby selecting the proper voltages for the elements of the tube; a switch operable as an incident to the operation of the single manipulative means to cut the resistor out of the plate circuit of the tube; and a switch having two positions, said switch being adapted in one of its positions to cause the transformer to be energized and to cause a voltage of a certain value to be applied to the grid element of the tube, said switch being adapted in its other position to cause the transformer to be energized and to cause a voltage of a different value to be applied to the grid element of the tube to make a plurality of tests of the electrical condition of the tube elements.

4. In an audion tube tester; the combination with a normally de-energized transformer having its primary and secondary windings arranged to supply a plurality of voltages; and an electrical network comprising a plurality of circuits connected to the transformer and to the tube elements; an electrical measuring instrument connected in said network; of a plurality of selector switches connected in the electrical network intermediate the transformer and the tube elements; a single means synchronously to operate all of the selector switches to select the proper circuits for the tube elements; and a single means simultaneously to energize the transformer and alternately to apply a voltage of certain value, and then to apply a voltage of a different value to a certain one of the tube elements to test the electrical condition of said certain element.

5. In an audion tube testing device, the combination of a transformer having means for connecting the primary winding thereof across an alternating current source, an electrical network, a tube socket connected in said network said socket being adapted to receive an audion tube, a plurality of selector switches connected in said network and having the terminals thereof connected to the primary and secondary windings of the transformer so that each terminal will receive a voltage of predetermined value, a dial inscribed with the indicia of a plurality of audion tubes, a rotatable member adapted to be rotated to set the selector switches to positions corresponding to the index on the dial to select the predetermined voltages to be applied to the terminals of the audion tube, a switch having a position to energize the transformer and to determine that a voltage of a certain value is to be applied to a certain element of the tube and a position to energize the transformer and to determine that a voltage of a certain other value is to be applied to said certain element of the tube, and an electrical measuring instrument to indicate the electrical condition of the tube.

JOHN GERSTLE.